United States Patent

Georgi

[15] 3,702,076

[45] Nov. 7, 1972

[54] ELECTRONIC THERMOMETER
[72] Inventor: Heinz W. Georgi, La Jolla, Calif.
[73] Assignee: Ivac Corporation, San Diego, Calif.
[22] Filed: June 15, 1970
[21] Appl. No.: 45,990

[52] U.S. Cl. ........................................... 73/362 AR
[51] Int. Cl. .............................................. G01k 7/24
[58] Field of Search ............... 73/362 AR, 362 R, 359

[56] References Cited

UNITED STATES PATENTS 3,111,032  11/1963  Wormser et al. ............. 73/359
3,477,292  11/1969  Thornton ..................... 73/362

Primary Examiner—Louis R. Prince
Assistant Examiner—Denis E. Corr
Attorney—Fulwider, Patton, Rieber, Lee & Utecht

[57] ABSTRACT

Electronic apparatus for measuring temperatures by means of a thermistor in one arm of a Wheatstone bridge, bridge balance being accomplished by a plurality of shunt resistances selectively inserted into the balancing arm of the bridge by counter controlled switching, the counter state being altered by gated clock pulses to provide a digital indication of measured temperature. Anticipation circuitry is provided for correlating the time between counter clock pulses with the time vs. temperature characteristic of the thermistor to selectively alter bridge balance and counter state so as to provide an earlier indication of the anticipated temperature at which the thermistor will finally stabilize.

34 Claims, 12 Drawing Figures

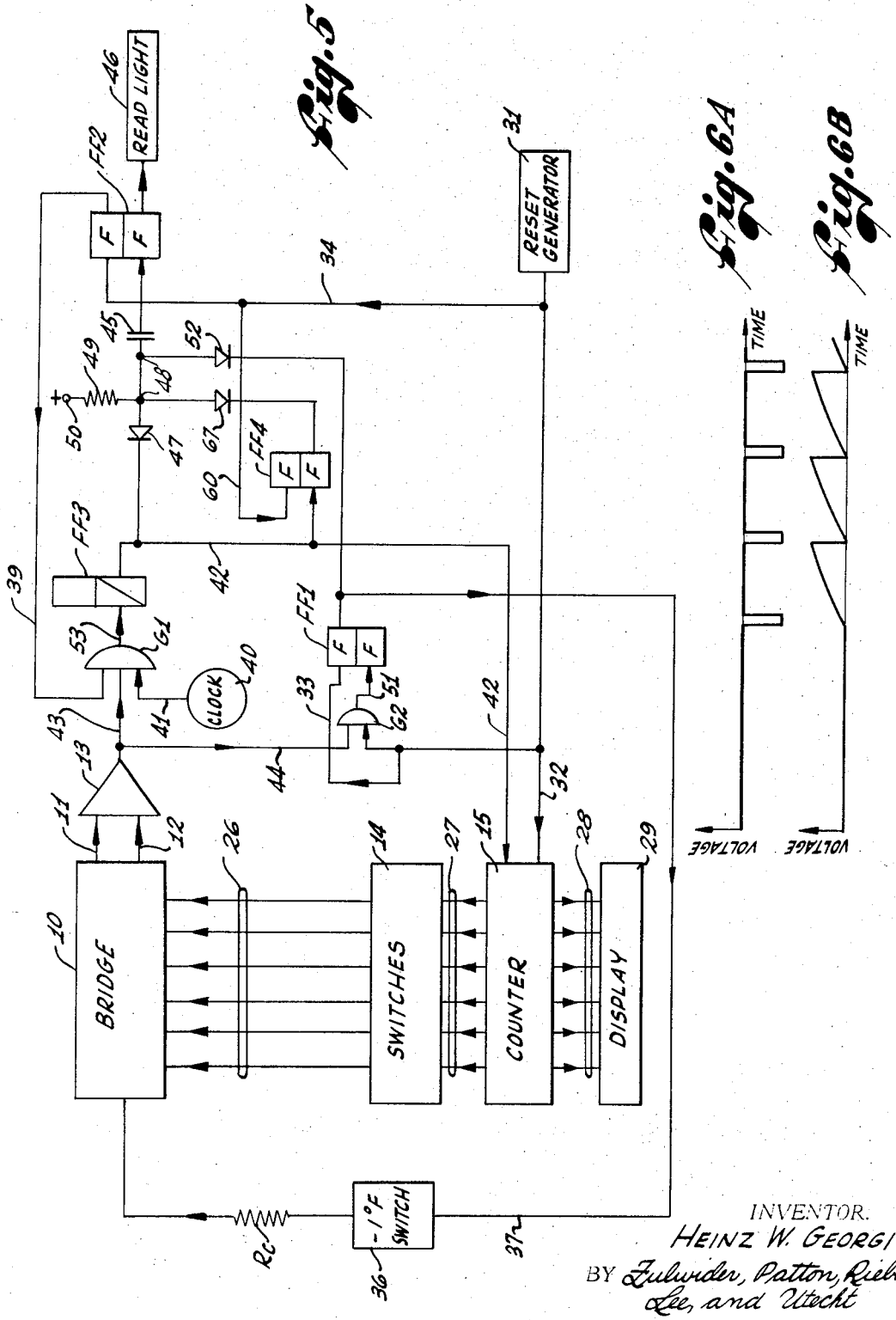

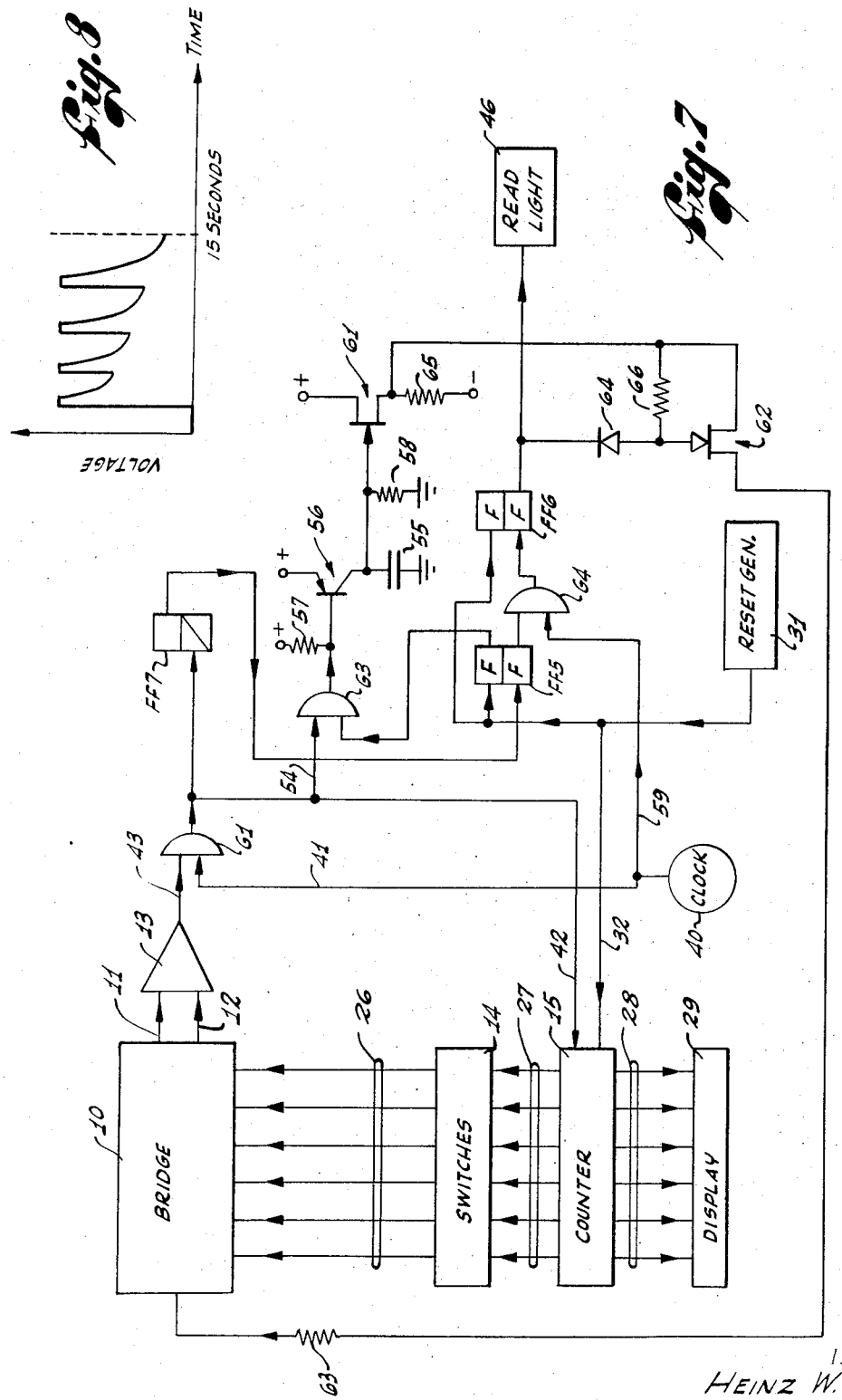

3,702,076

ELECTRONIC THERMOMETER

BACKGROUND OF THE INVENTION

This invention relates generally to improvements in thermometer devices and, more particularly, to new and improved electronic thermometers, whereby accurate, reliable and easily read temperature measurements may be rapidly obtained.

It is common practice in the medical arts, as in hospitals and in doctors' offices, to measure the body temperature of a patient by means of a glass bulb thermometer incorporating a heat responsive mercury column which expands and contracts adjacent a calibrated temperature scale. Typically, the glass thermometer is inserted into the patient, either orally or rectally, and subsequently removed after a sufficient time interval has passed to enable the temperature of the thermometer to stabilize at the body temperature of the patient. This time interval is usually of the order of 2 to 4 minutes. After a sufficient period of time has elapsed, the thermometer is removed from the patient and is subsequently read by appropriate medical personnel.

It will be apparent from the foregoing that conventional temperature measurement procedures using glass bulb thermometers and the like are prone to a number of significant deficiencies. Temperature measurement is rather slow and, for patients who cannot be relied upon (by virtue of age or infirmity) to properly retain the thermometer for the necessary period of insertion in the body, may necessitate the physical presence of medical personnel during a relatively long measurement cycle, thus wasting valuable time. Furthermore, glass bulb thermometers are not as quick and easy to read and, hence, measurements are prone to human error, particularly when made under poor lighting conditions or read by harried personnel.

Various attempts have been made by the prior art to minimize or eliminate the aforedescribed deficiencies of the glass bulb thermometer by using appropriate temperature sensing probes which are designed to operate in conjunction with direct reading electrical thermometer instrumentation, typically employing an output galvanometer having an indicator needle moving along a calibrated scale. However, such probes and electrical thermometers have typically proven to be just as slow in making temperature measurements as glass bulb thermometers and, at best, output measurements have been only slightly easier to read.

Hence, those concerned with the development and use of thermometer apparatus in the medical field have long recognized the need for improved temperature measuring devices which result in accurate, reliable, more rapidly obtained and easily read measurements. The present invention fulfills these needs.

SUMMARY OF THE INVENTION

Briefly, and in general terms, the present invention involves a new and improved electronic thermometer capable of providing a temperature measurement output as a direct digital display, and, further, capable of providing a final temperature measurement output indication prior to actual stabilization of the thermometer input at the anticipated final temperature indicated.

Basically, the present invention includes a temperature responsive transducer in one arm of an electrical bridge network, the bridge including a balancing arm having a variable impedance, the impedance being selectively varied under the control of a digital counter indicating temperature, the counter being continually counted up by electrical impulses so long as the transducer temperature exceeds the temperature represented by the bridge balance impedance. The time period between successive impulses to the counter is correlated with the time vs. temperature characteristic of the temperature responsive transducer to selectively alter bridge balance and, hence, the state of the counter, so that the counter will rapidly count up to the anticipated temperature at which the transducer will finally stabilize and will do so substantially sooner than actual stabilization of the transducer at its final temperature. The final temperature registered in the counter is appropriately indicated by a digital display unit connected to receive the counter output, the digital display providing an easily read output indication of temperature.

More specifically, and in a presently preferred embodiment, by way of example and not necessarily by way of limitation, an electronic thermometer embodying the various features of the invention may include a thermistor as the temperature responsive transducer in the measurement arm of a Wheatstone bridge, the balancing arm of the bridge having a bank of parallel resistances, each resistance being selectively inserted into the bridge balancing arm under the control of its own switch, all of these switches being in turn controlled by various counting states registered in the digital counter indicating temperature, the counter being counted up by clock pulses which are gated on only when the thermistor temperature exceeds the equivalent temperature represented by the resistance in the bridge balancing arm. Since the thermistor approaches its final stable temperature asymptotically, it will be apparent that the last increments of temperature change occur very slowly, whereas the major portion of the temperature change in stabilizing the thermistor at the temperature of the environment, occurs relatively rapidly. Hence, in accordance with the invention, the time period between clock pulses gated to the counter is correlated with the rate of change of the thermistor temperature to anticipate the remaining temperature differential between the actual thermistor temperature and the final thermistor temperature, and to alter the balancing arm of the bridge accordingly so that the counter registers the anticipated final temperature long before the thermistor would normally actually stabilize at such a final temperature. The result is a much more rapid, yet accurate and reliable temperature measurement.

In accordance with the invention, correlation of the time period between clock pulses passing to the counter with the temperature vs. time characteristic of the thermistor, and altering the state of balance of the bridge, may be accomplished in any of several ways.

In one presently preferred embodiment of the invention, an additional resistance shunts the bridge balance arm so that the balancing arm and the counter are out of phase by the equivalent of a predetermined temperature differential, i.e., the counter is driven to a higher counter state than would ordinarily be dictated by the actual thermistor temperature, in order to compensate for the additional resistance shunting the balancing arm. Hence, the temperature indicated by the counter display leads the actual temperature of the thermistor by the predetermined temperature differential. It can be readily ascertained empirically, for any given thermistor probe, how the rate of change of temperature varies with time, and the latter can be correlated with the time period between pulses passed to the counter to determine when the actual thermistor temperature differs from its final stable temperature by the aforedescribed predetermined temperature differential between the counter state and the temperature represented by the bridge balancing arm resistance. In this connection, the time interval between pulses passed to the counter is monitored and, when the time interval reaches the proper magnitude, the pulses to the counter are gated off to freeze the counter and its associated display at an indication representing the anticipated final temperature of the thermistor.

In an alternative embodiment of the invention, a specified time of measurement is selected, e.g., 15 seconds. At that point, a voltage which is a function of the remaining temperature differential between the actual thermistor temperature and its anticipated final temperature is inserted into the bridge balance arm to deliberately unbalance the bridge and to force the counter to rapidly count up to a state representing the final anticipated temperature.

The electronic thermometer apparatus of the present invention satisfies a long existing need in the medical arts for a thermometer capable of making accurate, reliable and easily read temperature measurements much more rapidly than has heretofore been feasible with the thermometers of the prior art.

The above and other objects and advantages of this invention will be apparent from he following more detailed description when taken in conjunction with the accompanying drawings of illustrative embodiments.

DESCRIPTION OF THE DRAWINGS

FIG. 5 is a combined block diagram and electrical schematic of another embodiment of an electronic thermometer embodying the invention;

FIGS. 6A and 6B are waveforms applicable to various portions of the electrical circuitry illustrated in FIG. 5;

FIG. 7 is a combined block diagram and electrical schematic of still another embodiment of an electronic thermometer in accordance with the present invention; and FIG. 8 is a waveform applicable to a portion of the electrical circuitry illustrated in FIG. 7.

DESCRIPTION OF THE PREFERRED EMBODIMENTS

Figure 1:
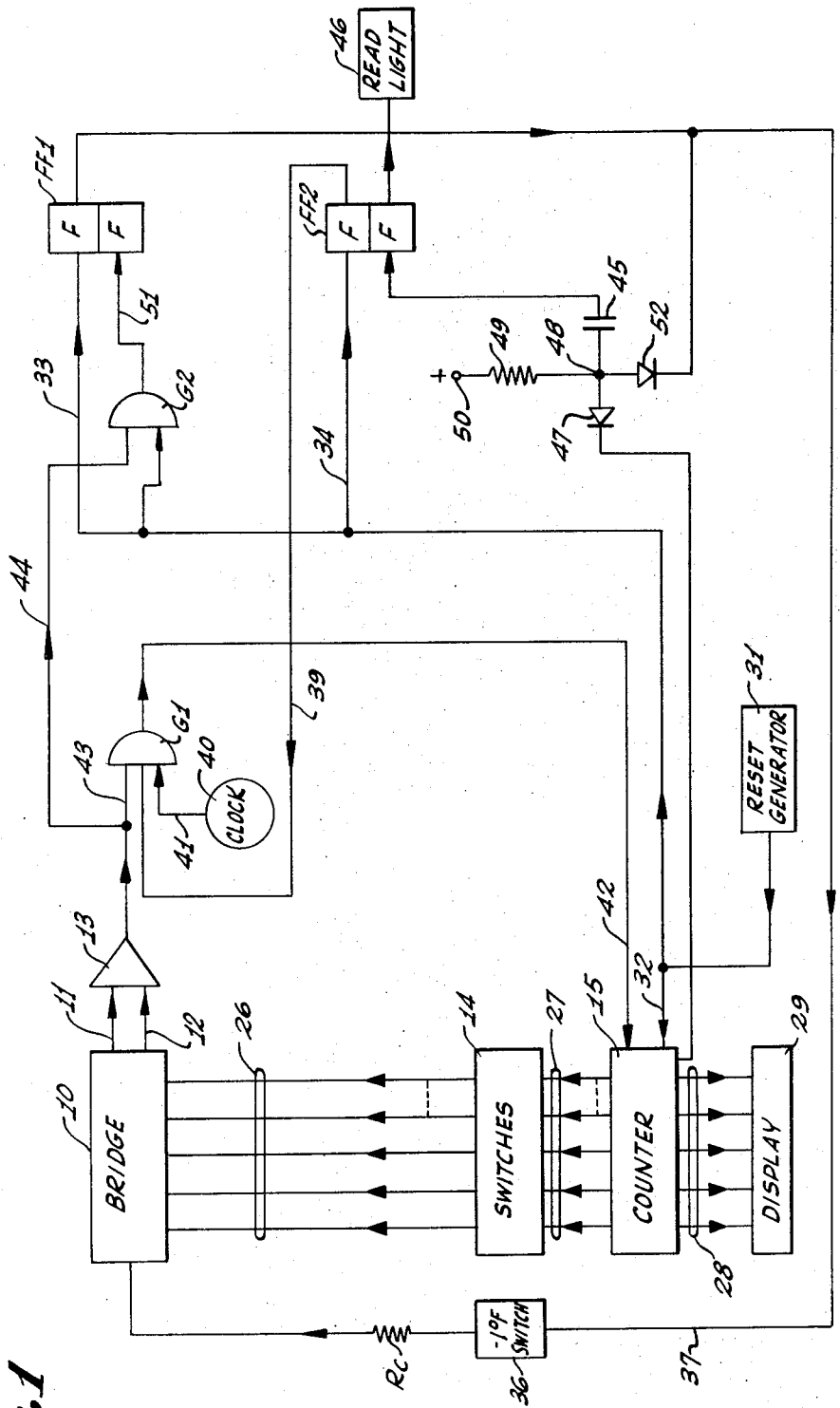
FIG. 1 is a combined block diagram and electrical schematic of a first embodiment of an electronic thermometer in accordance with the present invention.

Referring now to the drawings, and particularly to FIG. 1 thereof, there is shown a generalized system for one embodiment of an electronic thermometer incorporating the novel features of the present invention. The thermometer system includes a basic temperature measurement subsystem including an electrical bridge 10 having a pair of output lines 11 and 12 which are directed as electrical input to an operational amplifier 13 which is used as a d.c. level comparator. The state of balance of the bridge 10 is under the control of a bank of switches 14 which, in turn, are either opened or closed in accordance with the count registered in a digital counter 15.

Figure 2:
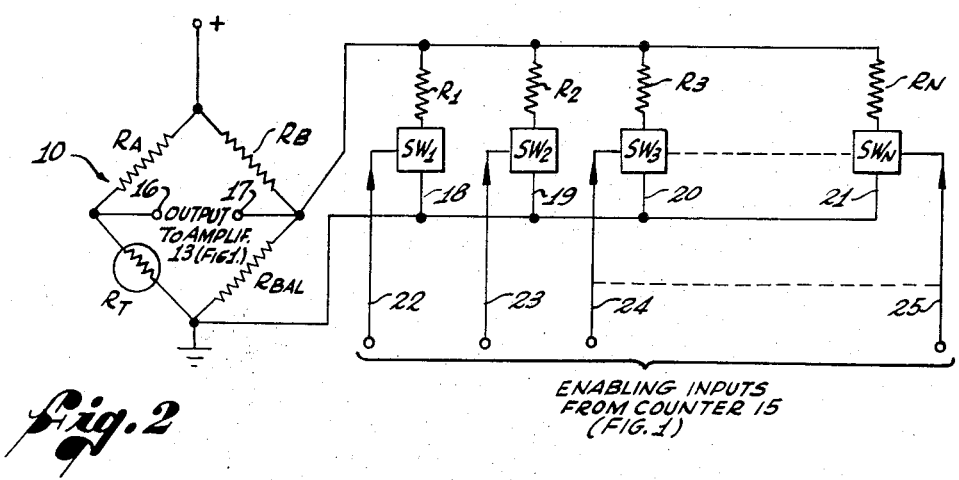
FIG. 2 is a combined block diagram and electrical schematic of a suitable bridge network for the electronic thermometer of the invention.

One example of electrical circuitry suitable for the aforedescribed bridge subsystem is shown in FIG. 2. The subsystem of FIG. 2 includes a bridge 10 having resistances $R_A$, $R_B$, $R_T$ and $R_{BAL}$ electrically connected in a conventional d.c. Wheatstone bridge configuration, with the electrical output of the bridge available at terminals 16, 17. Resistances $R_A$ and $R_B$ are reference resistors, while resistance $R_T$ is the resistance of a thermistor or other suitable temperature responsive transducer whose impedance varies with temperature. $R_{BAL}$ is the basic resistance in the balancing arm of the bridge 10, the total resistance in the bridge balancing arm being varied by selectively inserting any one or more of a plurality of resistors $R_1$, $R_2$, $R_3$ ... $R_N$ which are electrically connected in parallel with the resistance $R_{BAL}$ whenever corresponding switches $Sw_1$, $Sw_2$, $Sw_3$ ... $Sw_N$, respectively, are closed to connect the appropriate resistors into the bridge circuit via the lines 18, 19, 20, 21, respectively. The switches $Sw_1$ through $Sw_N$ are typically solid state switches in the form of transistors which are selectively cut-off or driven to saturation by enabling inputs to the switches over lines 22, 23, 24, 25, respectively, from the digital counter 15. Hence, the net resistance in the bridge balancing arm is selectively varied by the state of the counter 15, in a manner to be hereinafter described, so as to reduce the electrical output of the bridge 10 to zero and thereby correlate the count registered in the counter 15 with the resistance $R_T$ representing the temperature being measured.

Referring now again to FIG. 1, the bank of switches 14 correspond t the switches $Sw_1$ through $Sw_N$ in FIG. 2, and the lines 26 between the switches 14 and the bridge 10 correspond to the lines 18 through 21 in FIG. 2 for selectively connecting shunt resistors into the balancing arm of the bridge. Similarly, the input lines 27 to the bank of switches 14 from the counter 15 correspond to the enabling input lines 22 through 25 of the subsystem illustrated in FIG. 2. Appropriate signals indicating the state of the digital counter 15 are also directed in the conventional manner over a plurality of lines 28 to a suitable digital display 29 so that measured temperatures are displayed directly and in easily read form.

Figure 3A:
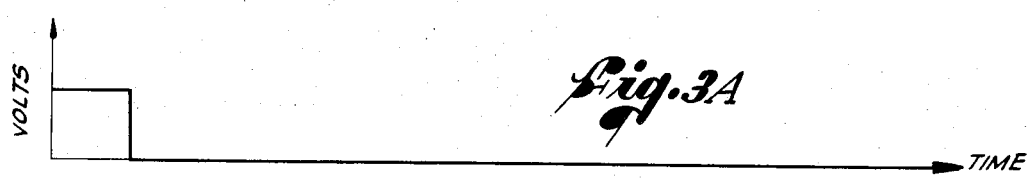
FIGS. 3A, 3B, 3C and 3D are waveforms applicable to various portions of the electrical circuitry shown in FIG. 1.

A reset generator 31 generates a reset signal with the waveform shown in FIG. 3A, the reset signal being directed over line 32 to reset the counter 15 at the beginning of a measurement cycle to a predetermined temperature count, such as 90° F. Resetting of the counter 15 also resets the switches 14 and the balancing arm of the bridge 10, as well as the display 29, to the proper parameter settings for the predetermined starting temperature of 90° F. The latter figure of 90° F. is not critical, but is used by way of practical example in the ensuing discussion. It will be apparent that other initial temperature settings may be selected, and that the temperature may be expressed in any convenient scale of temperature units, such as degrees Centigrade instead of degrees Fahrenheit.

The reset generator 31 also directs the same reset signal over line 33 to the upper half of an anticipation mode control flip-flop $FF_1$ and over line 34 to the upper half of a counter pulse and read light control flip-flop $FF_2$.

When the upper half of the flip-flop $FF_1$ is set "true" by the reset pulse over line 33, the latter state of the flip-flop enables a switch 36 over line 37 to insert an additional anticipation mode resistor $R_C$ in parallel with the resistance of the balancing arm in the bridge 10. The switch 36 is typically of the same type as the switches 14 and is referred to as a "−1° F. switch" since the insertion of the resistor $R_C$ into the balancing arm of the bridge 10 causes the bridge and the counter 15 to be out of phase by the equivalent of a 1° F. temperature differential. In this regard, the count registered in the counter 15 is 1° F. higher than would ordinarily be dictated by the actual temperature of the thermistor as represented by the bridge resistance $R_T$, in order to compensate for the additional resistance $R_C$ shunting the bridge balancing arm and restore balance. Hence, the temperature indicated by the counter display 29 leads the actual temperature of the thermistor by the predetermined temperature differential of 1° F.

Figure 4:
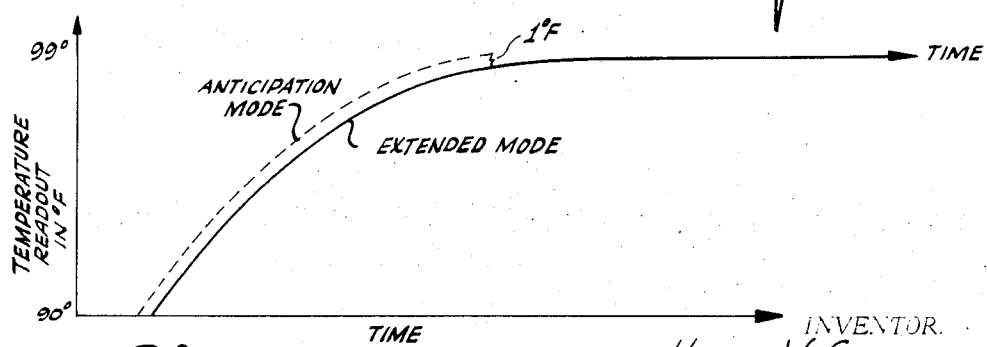
FIG. 4 is a temperature vs. time characteristic, illustrating both actual and indicated temperatures, for a temperature responsive transducer used with the electronic thermometer of the present invention.

The reason for forcing the counter 15 and its associated display 29 to lead the actual temperature of the thermistor, when the electronic thermometer of the present invention is operating in its rapid anticipation mode, will be apparent from the curves shown in FIG. 4.

FIG. 4 shows the temperature readout vs. time characteristics of the thermometer for both an extended mode (shown as a solid line) and for the rapid anticipation mode (shown as a dashed line). It will be apparent that, in the extended mode of operation, the thermometer characteristic essentially duplicates the temperature vs. time characteristic of the thermistor, and that the final stable temperature is gradually approached asymptotically over a relatively long time interval, typically of the order of 2 to 4 minutes in practice. However, it will also be apparent that the major portion of the temperature adjustment in ultimately stabilizing the thermistor at the temperature of its environment occurs relatively rapidly, i.e., the thermistor is within 1° F. of its final stable temperature in a very short period of time, typically twelve to eighteen seconds. Hence, by operating the electronic thermometer of the present invention in the anticipation mode, wherein the counter 15 and its display 29 in FIG. 1 lead the thermistor temperature by a predetermined temperature differential of 1° F. or the like, accurate temperature measurements may be obtained very rapidly.

When the upper half of the flip-flop $FF_2$ is in the "true" state, an enabling input is directed over line 39 to an And gate $G_1$ which selectively gates pulses from a conventional clock generator 40, received as input over line 41, as output directed over line 42 to the counting circuits of the counter 15. At the same time, the lower half of the flip-flop $FF_2$ is set "false" to turn off a read light 46.

The gate $G_1$ also receives as an input over line 43 the electrical output of the amplifier 13. In this connection, the gate $G_1$ is enabled by a "true" output from the amplifier 13, the latter occurring only when the thermistor temperature represented by the resistance $R_T$ exceeds the equivalent temperature represented by the net resistance in the balancing arm of the bridge 10.

The electrical output of the amplifier 13 is also directed as input over line 44 to an And gate $G_2$. As in the case of the gate $G_1$, if the output of the amplifier 13 is "true," the gate $G_2$ is enabled.

As previously indicated, the electronic thermometer of the present invention can operate in either an extended mode wherein the indicated temperature is the same as the temperature of the thermistor represented by the resistance $R_T$, or in a rapid anticipation mode wherein the measured temperature indicated is an extrapolated higher temperature rather than the actual thermistor temperature. The thermometer system shown in FIG. 1 always starts initially in the anticipation mode of measurement and remains in the anticipation mode if the resistance $R_T$ indicates a lower thermistor temperature at the beginning of the measurement cycle than the initial setting of the net resistance in the balancing arm of the bridge 10. Since the reset generator 31 initially sets the counter 15 to 90° F., but also closes the switch 36 through the flip-flop $FF_1$ to set the bridge balancing arm for an equivalent temperature of 89° F. (1° F. lower than the counter setting), the initial output from the amplifier 13 will be "true" only if the initial temperature of the thermistor represented by $R_T$ is greater than 89° F. If the initial temperature is less than 89° F., as is usually the case, then the electrical output from the operational amplifier 13 is "false." Hence, if the output of the amplifier 13 is initially "false," then the gate $G_2$ remains disabled through the initial reset pulse period and, therefore, the upper half of the flip-flop $FF_1$ remains in the "true" state, with the result that the resistor $R_C$ stays connected into the bridge 10 and the thermometer system remains in the anticipation mode of operation.

Figure 3B:
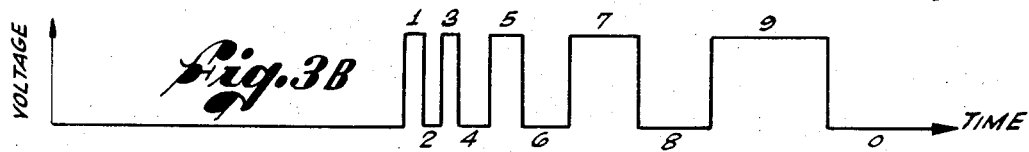

When the thermistor finally warms sufficiently so that its temperature exceeds 89° F., the output of the amplifier 13 goes "true" and the gate $G_1$ is enabled, so that clock pulses are passed to the counter 15 which, together with the associated display 29, always indicates 1° F. more than the actual temperature of the thermistor. The electrical circuitry of the counter 15, since it is intended to indicate temperature, includes a 0.1° F. binary (not shown) of conventional design. The electrical output state of this 0.1° F. binary is changed with each 0.1° increment of the counter and is indicated by the waveform shown in FIG. 3B. It will be apparent that, as the thermistor and thermometer approach a final temperature as shown in FIG. 4, the 0.1° binary remains in each numerical state for longer periods of time before being switched by another clock pulse. The time in each numerical state is a measure of the time period between clock pulses passed by the gate $G_1$ to the counter 15.

In accordance with the invention, the output states of the 0.1° binary in the counter 15 are utilized to charge and discharge a timing capacitor 45 so that, when the time between successive clock pulses to the counter is such that empirical evidence has established the thermistor is within one degree of its final anticipated temperature, the capacitor will provide a discharge spike of sufficient amplitude to switch the lower half of flip-flop $FF_2$ to its "true" state, thus turning on the read light 46 and setting the upper half of flip-flop $FF_2$ "false." The latter disables the gate $G_1$ to freeze the count in the counter 15 at the count produced by the last clock pulse passed over line 42.

Figure 3C:
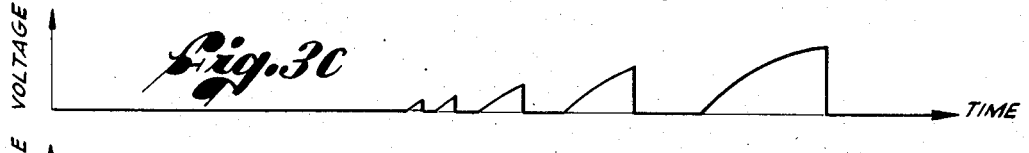
Figure 3D:

The output electrical states of the 0.1° binary are connected through a diode 47 to the capacitor 45. FIG. 3C shows the charging waveform for the capacitor 45 as measured at the junction 48. During the odd numerical states of the 0.1° binary, the diode 47 is back biased so that the capacitor 45 charges through a resistor 49 from a suitable source of positive potential at terminal 50. During the even numerical states of the 0.1° binary, the diode 47 is forward biased, and the capacitor 45 discharges to provide the voltage spikes indicated by the waveform of FIG. 3D measured at the input to the flip-flop $FF_2$. The amplitude of the voltage spike produced by the capacitor 45 during discharge is a function of the charge of the capacitor accumulated during the odd numbered state of the 0.1° binary and is, therefore, proportional to the time during which the capacitor is charged which, in turn, is proportional to the time between successive clock pulses passed to the counter 15. Hence, a measurement system is provided which rapidly provides a final temperature measurement indication far in advance of the actual time it would otherwise take for the thermistor to stabilize at its anticipated final temperature.

In the event the thermistor is initially at a temperature in excess of 89° F. at the beginning of a measurement cycle, then the output of the amplifier 13 and input to the gate $G_2$ over line 44 are both "true" during the reset period indicated by the reset pulse shown in FIG. 3A. Thus, the gate $G_2$ is enabled during the reset period, and the transient pulse generated by termination of the reset signal is passed by the gate $G_2$ over line 51 to switch the lower half of the flip-flop $FF_1$ to the "true" state, thereby switching the upper half of the flip-flop $FF_1$ to the "false" state and turning off the switch 36 to remove the resistance $R_C$ from the bridge balancing arm. This places the equivalent temperature represented by the balancing arm resistance back in phase with the counter 15 and converts the thermometer system to the extended mode of operation. Since the gate $G_1$ is also enabled by the "true" output of the amplifier 13, the latter gate immediately passes clock pulses to the counter 15 which then counts up to the temperature of the thermistor and tracks the thermistor temperature until the temperature measured stabilizes at a final value. In the extended mode of operation, the read light 46 is not activated upon completion of the measurement cycle, the final temperature measurement being indicated merely by a lack of further change in the output display 29.

The timing circuitry for the capacitor 45 is disabled, when the thermometer is in the extended mode of operation by tying the junction 48, through a diode 52, to the upper half of the flip-flop $FF_1$. Since the upper half of the flip-flop $FF_1$ is "false" during the extended mode, the diode 52 is forward biased so that the capacitor 45 cannot charge during the extended mode. It will also be apparent that, during the anticipated mode of operation, the diode 52 is back biased by the "true" state of the flip-flop $FF_1$ and, thus, does not interfere with charging of the capacitor 45.

It will be apparent that, while the system shown in FIG. 1 has been described as introducing a $-1°$ F. phase difference at the beginning of the anticipation mode of operation of the thermometer, the system logic can just as readily be altered to insert the 1° phase difference (or any other predetermined temperature differential) at the end of the anticipation mode cycle, without in any way departing from the spirit and scope of the present invention.

Referring now to FIG. 5, there is shown an alternate embodiment of an electronic thermometer in accordance with the invention. In the system of FIG. 5, like reference numerals denote like or corresponding parts in the electronic thermometer system of FIG. 1. The primary difference between the system of FIG. 5 and the system of FIG. 1 resides in the ability to charge and discharge the timing capacitor 45 during every new state of the 0.1° binary of the counter 15, as opposed to being limited to charging of the capacitor during odd numerical states and discharging of the capacitor during even numerical states. The result is an improvement by 0.1° in the precision of measurement in the anticipation mode of operation.

In the system of FIG. 5, the clock pulses passed by the gate $G_1$ are not sent directly to the counter 15. Instead, eack clock pulse passed by the gate $G_1$ is directed to the lower half of a monostable flip-flop or one-shot $FF_3$, so that each of the pulses passed by the gate $G_1$ over line 53 sets the one-shot to its unstable state, thereby generating the waveform shown in FIG. 6A. The pulse output from the lower half of the one-shot is directed over line 42 as pulse input to the counter 15.

During the reset period, the reset signal from the reset generator 31 is also directed over line 54 to set the upper half of a flip-flop $FF_4$ to the "true" state, thus setting the lower half of the flip-flop $FF_4$ "false," so that the electrical junction 48 in the timing circuitry is clamped to a negative potential through a forward biased diode 55, thereby preventing the capacitor 45 from charging during the reset period. However, the first pulse from the one-shot $FF_3$ over line 42 switches the lower half of the flip-flop $FF_4$ to the "true" state, thus back biasing the diode 55 and no longer preventing the capacitor 45 from otherwise being charged.

As will be apparent from the capacitor charging waveform of FIG. 6B, when compared with the one-shot waveform of FIG. 6A, the capacitor 45 is charged between each pair of successive pulses from the one-shot $FF_3$ and is rapidly discharged during each brief one-shot pulse. This occurs because the diode 47 is back-biased between one-shot pulses, whereas the diode 47 is forward biased during each one-shot pulse to provide a discharge path for the capacitor 45. As in the case of the thermometer system of FIG. 1, when the charging time of the capacitor 45 indicates that $R_T$ is within the predetermined temperature differential of its final anticipated stable temperature, the capacitor will provide a discharge spike of sufficient amplitude, during the next one-shot pulse, to switch the flip-flop $FF_2$, turn on the read light 46, and freeze both the counter 15 and output display 29.

Referring now more particularly to FIG. 7, an additional system is shown for making rapid temperature measurements in accordance with the present invention. In the system of FIG. 7, like reference numerals denote like or corresponding parts in the electronic thermometer system of FIG. 1. The primary difference between the system of FIG. 7 and the system of FIG. 1 is that the system of FIG. 7 does not have an extended mode of operation, and the FIG. 7 system inserts an anticipated temperature differential at the end of the measurement cycle rather than at the beginning of the cycle.

In the system of FIG. 7, the reset pulse generated by the reset generator 31, in addition to setting the counter 15 to the initial temperature prescribed at the beginning of the measurement cycle, also sets the upper half of a flip-flop $FF_5$ to the "true" state and sets the upper half of a read light flip-flop $FF_6$ "true." The "true" state of the flip-flop $FF_5$ enables an And gate $G_3$, while the "true" state of flip-flop $FF_6$ sets the lower half of flip-flop $FF_6$ "false" to turn off the read light 46 at the beginning of the measurement cycle.

The first clock pulse is passed through the gate $G_1$ when the thermistor temperature rises high enough to exceed the initial setting of the counter 15. The first clock pulse is also directed to the lower half of a one-shot $FF_7$ and places the one-shot in its unstable state, the time constants of the one-shot being selected to hold the upper half of the one-shot "false" for the preselected duration of the measurement cycle, typically 15 seconds. It will be apparent, however, that the 15 second time period is not critical, and the length of the measurement cycle may be varied in accordance with the accuracy of measurement desired.

Each of the pulses passed by the gate $G_1$ is also directed over a line 60 as pulse input to the enabled And gate $G_3$, and the latter gate passes these pulses to charge a timing capacitor 67 through a transistor 56. A resistor 57 provides base bias for the transistor 56. The capacitor 55 is rapidly charged by each clock pulse passed by the gate $G_3$ and the capacitor discharges through a resistor 58 between pulses, to produce the capacitor voltage waveform shown in FIG. 8. The flat spot shown at the peak of each charging cycle in FIG. 8 is the saturation level of the transistor 56 which holds the capacitor 55 in the charged state.

After 15 seconds, the upper half of the one-shot $FF_7$ goes "true" which, in turn, sets the lower half of the flip-flop $FF_5$ "true" and switches the upper half of the latter flip-flop "false," so that the gate $G_3$ is disabled while the And gate $G_4$ is enabled. Hence, the very next clock pulse is directed over line 59 through the enabled gate $G_4$ to switch the lower half of the flip-flop $FF_6$ to the "true" state, thus turning on the read light 46.

When the gate $G_3$ is disabled, the capacitor 67 continues to discharge through the resistor 58, and the capacitor voltage is transmitted through a first field effect transistor 61, connected in a conventional source follower configuration, and a second field effect transistor 62, connected in a conventional switching configuration, across a balance arm bridge resistor 63. The switching transistor 62 is turned on with the read light 46 by back biasing a diode 64 connected between the gate electrode of the switching transistor and the lower half of the flip-flop $FF_6$. Of course, when the lower half of the flip-flop $FF_6$ is "false," the diode 64 is forward biased, thereby clamping the gate electrode of the switching transistor 62 to a negative potential which gates off the transistor.

Resistors 65 and 66 are conventional bias resistors for the transistors 61 and 62, respectively. The resistor 63 is a high resistance, typically between 10 kilohms and 100 kilohms, so that the capacitor voltage is inserted into the bridge without excessively loading the bridge.

The voltage of the capacitor 67 inserted into the bridge 10 is the voltage level to which the capacitor has discharged in the time between the last pulse which charged it and the next pulse which turns on the switching transistor 62. The latter time interval between successive pulses varies inversely as a function of how close the thermistor and its resistance $R_T$ are to the final stable temperature, so that the capacitor voltage which is inserted into the bridge becomes smaller as the final temperature is approached. The bridge parameters and RC time constant for the capacitor 67 and the resistor 58 are selected so that, at the particular time of sampling selected, e.g., fifteen seconds after reset, the voltage inserted into the bridge 10 will cause the counter 15 to be rapidly counted up by a temperature differential approximating the difference between the anticipated final temperature of the thermistor and the actual thermistor temperature at the time of sampling.

The aforedescribed electronic thermometer systems of the present invention satisfy a long existing need for thermometers capable of making accurate, reliable and easy to read temperature measurements at speeds heretofore considered unfeasible.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:
1. Electronic apparatus comprising:
sensing means for varying an electrical parameter in accordance with a condition being monitored;
measuring means for measuring said electrical parameter and thereby measuring said condition, said measuring means including an electrical bridge network having a detector responsive to an unbalanced state of said bridge network to tend to rebalance said bridge network; and
means for altering the state of said measuring means as a function of the rate of change of said electrical parameter to provide an advance indication of the final state of said condition, said altering means including means for deliberately unbalancing said bridge network to alter the state of said detector.

2. Electronic apparatus as set forth in claim 1, wherein said sensing means is a temperature responsive transducer.

3. Electronic apparatus as set forth in claim 2, wherein said transducer is a thermistor.

4. Electronic apparatus as set forth in claim 1, wherein said measuring means includes a counter.

5. Electronic apparatus as set forth in claim 4, wherein said counter is a digital counter and display.

6. Electronic apparatus comprising:
sensing means for varying an electrical parameter during a measurement cycle in accordance with a condition being monitored;
measuring means for measuring said electrical parameter and thereby measuring said condition, said measuring means including a counter;
means responsive to said measuring means for providing pulses dependent on the sensed parameter; and
means for altering the state of said measuring means as a function of the rate of change of said electrical parameter to provide an advance indication of the final state of said condition, said rate of change being measured by the pulse rate of said pulses.

7. Electronic apparatus as set forth in claim 6, wherein said means for altering said measuring means only alters said measuring means at the beginning of a measurement cycle.

8. Electronic apparatus as set forth in claim 6, wherein said means for altering said measuring means only alters said measuring means at the end of a measurement cycle.

9. Electronic apparatus comprising:
sensing means for varying an electrical parameter in accordance with a condition being monitored;
measuring means for measuring said electrical parameter and thereby measuring said condition, said measurement means including an electrical bridge network having a balancing arm impedance selectively varied by a digital counter, said counter being responsive to pulses generated by an unbalanced state of said bridge network; and
means for altering the state of said measuring means as a function of the rate of change of said electrical parameter to provide an advance indication of the final state of said condition, said altering means being responsive to the time period between pulses driving said digital counter to deliberately unbalance said bridge network and alter the count registered in said counter.

10. Electronic apparatus as set forth in claim 9, and further including:
digital display means connected to said digital counter for displaying the count registered in said counter in eye readable form.

11. Electronic thermometer apparatus comprising:
first means for varying an electrical parameter in accordance with a temperature being monitored;
second means for providing an electrical output measurement of said temperature being monitored, said second means including a digital counter;
third means, responsive to said first means, for altering the state of said second means; and
fourth means responsive to the time period between pulses driving said digital counter for altering said electrical output measurement to provide an advance indication of an anticipated final value of said temperature being monitored.

12. Electronic thermometer apparatus as set forth in claim 11, wherein said fourth means only alters said output measurement at the beginning of a temperature measurement cycle.

13. Electronic thermometer apparatus as set forth in claim 11, wherein said fourth means only alters said output measurement at the end of a temperature measurement cycle.

14. Electronic thermometer apparatus, comprising:
electrical bridge means for varying an electrical parameter in accordance with a temperature being monitored, said bridge means including a balancing arm having a plurality of shunt resistors;
a switching means for each of said resistors for selectively inserting and removing each of said resistors from said balancing arm;
digital counter means for providing a digital electrical output measurement of said temperature being monitored, each of said switching means being selectively controlled by the count registered in said counter means for varying the net resistance of said balancing arm;
pulse generating and control means, responsive to an unbalanced state of said bridge means, for generating and directing pulses to said digital counter for varying said balancing arm impedance and restoring the balanced state of said bridge means; and
counter altering means for changing the count in said digital counter means as a function of the rate of change of said temperature being monitored to provide an advance indication of the anticipated final value of said temperature.

15. Electronic thermometer apparatus as set forth in claim 14, wherein the size of the count change in said digital counter means is varied in accordance with the magnitude of the time period between pulses driving said digital counter means.

16. Electronic thermometer apparatus as set forth in claim 14, wherein said altering means is responsive to the time period between pulses from said pulse generating and control means driving said digital counter means.

17. Electronic thermometer apparatus as set forth in claim 16, and further including:
disabling means for selectively disabling said altering means.

18. Electronic thermometer apparatus as set forth in claim 17, wherein said disabling means is responsive to the initial magnitude of said temperature being monitored.

19. Electronic thermometer apparatus as set forth in claim 14, wherein said altering means only changes the count in said digital counter means at the beginning of a temperature measurement cycle.

20. Electronic thermometer apparatus as set forth in claim 14, wherein said altering means only changes the count in said digital counter means at the end of a temperature measurement cycle.

21. Electronic thermometer apparatus as set forth in claim 14, and further including:
digital display means connected to said digital counter means for displaying the count registered in said counter means in eye readable form.

22. Electronic thermometer apparatus as set forth in claim 14, wherein said altering means includes means for unbalancing said bridge means to alter the count registered in said counter means.

23. Electronic thermometer apparatus as set forth in claim 22, wherein said altering means includes an additional resistance selectively shunting said balancing arm of said bridge means.

24. Electronic apparatus comprising:
sensing means for varying an electrical parameter in accordance with a condition being monitored;
measuring means for measuring said electrical parameter and thereby measuring said condition;
means responsive to said measuring means for providing pulses dependent on the sensed parameter;
means for measuring the rate of change of said electrical parameter by the time period between a pair of said pulses; and
means for altering the state of said measuring means as a function of said rate of change of said electrical parameter to provide an advance indication of the final state of said condition.

25. Electronic apparatus comprising:
sensing means for varying an electrical parameter in accordance with a condition being monitored;
measuring means, including a digital counter, for measuring said electrical parameter and thereby measuring said condition; and
means for altering the state of said measuring means as a function of the rate of change of said electrical parameter to provide an advance indication of the final state of said condition, said altering means being responsive to the time period between pulses driving said digital counter.

26. Electronic apparatus comprising:
sensing means for varying an electrical parameter in accordance with a condition being monitored;
measuring means for measuring said electrical parameter and thereby measuring said condition;
means for altering the state of said measuring means as a function of the rate of change of said electrical parameter to provide an advance indication of the final state of said condition; and
disabling means for selectively disabling said altering means without disabling said measuring means.

27. Electronic apparatus comprising:
sensing means for varying an electrical parameter in accordance with a condition being monitored;
measuring means for measuring said electrical parameter and thereby measuring said condition, said measuring means including an electrical bridge network having a balancing arm controlled by a digital counter, said counter being responsive to an unbalanced state of said bridge network; and
means for altering the state of said measuring means as a function of the rate of change of said electrical parameter, said altering means including means for deliberately unbalancing said bridge network to alter the count registered in said counter and provide an advance indication of the final state of said condition.

28. Electronic apparatus comprising:
sensing means for varying an electrical parameter in accordance with a condition being monitored;
measuring means for measuring said electrical parameter and thereby measuring said condition;
means for altering the state of said measuring means as a function of the rate of change of said electrical parameter to provide an advance indication of the final state of said condition; and
disabling means, responsive to the initial state of said condition being monitored, for selectively disabling said altering means.

29. Electronic thermometer apparatus comprising:
first means for varying an electrical parameter in accordance with a temperature being monitored;
second means for providing an electrical output measurement of said temperature being monitored;
third means, responsive to said first means, for altering the state of said second means;
fourth means for altering said electrical output measurement to provide an advance indication of an anticipated final value of said temperature being monitored; and
disabling means for selectively disabling said fourth means without disabling said second means.

30. Electronic thermometer apparatus comprising:
first means, including an electrical bridge network having a balancing arm, for varying an electrical parameter in accordance with a temperature being monitored;
second means, including a digital counter controlling said balancing arm, for providing an electrical output measurement of said temperature being monitored;
third means, responsive to an unbalanced state of said bridge network, for varying the state of said counter; and
fourth means for altering said electrical output measurement to provide an advance indication of an anticipated final value of said temperature being monitored, said fourth means including means for deliberately unbalancing said bridge network to alter the count registered in said counter.

31. Electronic thermometer apparatus comprising:
first means, including an electrical bridge network having a variable balancing arm impedance, for varying an electrical parameter in accordance with a temperature being monitored;
second means, including a digital counter for varying said balancing arm impedance for providing an electrical output measurement of said temperature being monitored;
third means, responsive to an unbalanced state of said bridge network, for generating pulses to alter the state of said counter; and
fourth means, responsive to the time period between pulses from said third means driving said counter, to deliberately unbalance said bridge network and alter the count registered in said counter, thereby providing an advance indication of an anticipated final value of said temperature being monitored.

32. Electronic thermometer apparatus comprising:
first means for varying an electrical parameter in accordance with a temperature being monitored;
second means for providing an electrical output measurement of said temperature being monitored;
third means, responsive to said first means, for altering the state of said second means;
fourth means for altering said electrical output measurement to provide an advance indication of an anticipated final value of said temperature being monitored; and disabling means, responsive to the initial magnitude of said temperature being monitored, for selectively disabling said fourth means.

33. Electronic thermometer apparatus, comprising:

first means for varying an electrical parameter during a measurement cycle in accordance with a temperature being monitored;

second means for measuring said electrical parameter and thereby measuring said temperature; and means for altering the state of said measuring means during said measurement cycle by a single value representing a fixed temperature differential, the magnitude of said value being a function of the rate of change of said electrical parameter, whereby an advance indication is provided of the anticipated final value of said temperature being monitored.

34. Electronic Thermometer apparatus, comprising:

first means for varying an electrical parameter during a measurement cycle in accordance with a temperature being monitored;

second means for providing an electrical output measurement of said temperature being monitored;

third means, responsive to the rate of change of said electrical parameter, for altering the duration of said measurement cycle; and fourth means for adding a fixed increment to said electrical output measurement to provide an advance indication of an anticipated final value of said temperature being monitored.

* * * * *

PO-1050
(5/69)

UNITED STATES PATENT OFFICE
CERTIFICATE OF CORRECTION

Patent No. 3,702,076          Dated November 7, 1972

Inventor(s) GEORGI, HEINZ W.

It is certified that error appears in the above-identified patent and that said Letters Patent are hereby corrected as shown below:

Column 3, line 39, delete "he" and replace with --the--.

Column 4, line 51, delete "t" and replace with --to--.

Column 8, line 38, delete "eack" and replace with --each--; line 48, delete "54" and insert --60--; line 53, delete "55" and insert --67--; line 57, delete "55" and insert --67--.

Column 9, line 46, delete "60" and insert --54--; line 48, delete "67" and insert --55--; line 65, delete "67" and insert --55--.

Column 10, line 20, delete "67" and replace with --55--; line 31, delete "67" and replace with --55--.

Column 11, line 49, delete "-" before "responsive".

Signed and sealed this 3rd day of April 1973.

(SEAL)
Attest:

EDWARD M. FLETCHER, JR.          ROBERT GOTTSCHALK
Attesting Officer               Commissioner of Patents